2,798,872

XANTHINE HYDROBROMIDES

Frederick Comte, Kirkwood, and William J. Detroit, St. Louis, Mo., assignors to Monsanto Chemical Company, St. Louis, Mo., a corporation of Delaware No Drawing. Application December 30, 1954,
Serial No. 478,869

5 Claims. (Cl. 260—253)

This invention relates to the preparation of xanthtine hydrobromides and more specifically pertains to a method for preparing anhydrous xanthine hydrobromides.

In general, xanthine hydrobromides exist as hydrates which are unstable and decompose on exposure to air. Certain of the xanthine hydrobromides would be exceptionally useful in the praparation of pharmaceutical compositions especially such compositions which produce selective, sedative effects. It is known that bromides are general sedatives but in certain applications it is not desirable to produce a general sedative effect on the entire nervous system. Hence, a specific stimulant such as a cerebral stimulant as caffeine is employed with the bromide with the overall effect that a sedative effect is produced without causing the person treated to become drowsy or fall asleep. Other of these xanthines which are specific stimulants are theobromine and theophylline. An additional property of the xanthine hydrobromides which would be useful in the preparation of pharmaceutical compositions are their acidic property which could be used where an acidic material is required to react with another component of the pharmaceutical preparation, for example, the liberation of carbon dioxide in an aqueous medium to form an effervescent fluid mixture.

Obviously, the xanthine hydrobromide hydrates would be unsatisfactory for such pharmaceutical preparations since they decompose readily on contact with air and would, therefore, not be suitable for pharmaceutical preparations where definite composition is important. Also, the xanthine hydrobromide hydrates become dark in color upon contact with air and produce the appearance that the pharmaceutical preparation contains dirt and/or foreign materials.

It has now been discovered that anhydrous xanthine hydrobromides can be stored safely for extended periods of time in contact with air and exposed to the effects of light without decomposing or discoloring. This ability is most unusual due to the fact that such xanthines as caffeine and theobromine and theophylline are very weak alkaline materials and their salts are considered to be very unstable. It is also unexpected that the xanthine hydrobromides when formed as anhydrous compositions do not pick up moisture and thereafter do not decompose as the hydrates do. It has also been discovered that anhydrous xanthine hydrobromides and especially anhydrous hydrobromides of di- and trimethyl xanthines such as anhydrous caffeine hydrobromide, anhydrous theobromine and anhydrous theophylline and anhydrous tetrahydro caffeine hydrobromide can be readily and conveniently prepared by reacting anhydrous xanthine with hydrogen bromide gas, preferably by reacting hydrogen bromide gas with the xanthine dissolved in a solvent for caffeine and especially a solvent which is initially anhydrous but which can take up at least small amounts of water either by solution or by reacting with the water. Preferred solvents for caffeine hydrobromides are chloroform, anhydrous ethanol.

The following specific examples illustrate the process of this invention in the preparation of anhydrous caffeine hydrobromides. In these examples the term "parts" is employed to indicate parts by weight.

Example I

Into a suitable reaction vessel having a means for external cooling there is dissolved 34 parts of anhydrous caffeine in about 200 parts of anhydrous chloroform. Into this solution dry hydrogen bromide vapors are bubbled for a period of about one hour while the reaction medium is cooled from about 35° C. to about 15° C. During the introduction of HBr into the chloroform solution, a white sandy solid precipitates. This white product is recovered and a second crop of white sandy material is obtained upon further cooling of the mother liquor. The white solid product is dried in a vacuum desiccator and then analyzed for its hydrogen bromide content. By analysis this product was found to contain 29.4% hydrogen bromide, the identical hydrobromide content for anhydrous caffeine hydrobromide. The total yield of anhydrous caffeine hydrobromide recovered from this process was 93.7% of the theoretical quantitative yield.

A small sample of the anhydrous caffeine hydrobromide prepared in Example I was stored in a glass bottle and exposed to light. This sample remained stable for a test period of 6 months.

Example II

There is dissolved in 275 parts of absolute ethyl alcohol 27 parts of anhydrous caffeine at about 78° C. The resulting solution is stirred and cooled while anhydrous hydrogen bromide gas is added thereto for a period of about one hour. Upon cooling, of the resulting ethanol solution with ice, a white precipitate formed. This precipitate is isolated, dried in a vacuum desiccator and analyzed for its hydrogen bromide content. By this process a satisfactory yield of anhydrous caffeine hydrobromide is obtained.

By substituting theobromine in the process of Example II anhydrous theobromine hydrobromide can be prepared in substantial quantitative yields. By following the process of either of Examples I or II anhydrous theophylline hydrobromide can be prepared by substituting anhydrous theophylline for caffeine.

The above description is intended to be illustrative of this invention and is not intended as a limitation thereon since variations and modifications of the process and products above described and within the spirit of this invention will be apparent to those skilled in the art.

What is claimed is:

1. The process for producing anhydrous caffeine hydrobromide comprising reacting anhydrous hydrogen bromide with caffeine dissolved in an anhydrous solvent.

2. The process for producing anhydrous caffeine hydrobromide comprising reacting anhydrous hydrogen bromide with caffeine dissolved in an anhydrous chloroform.

3. The process for producing anhydrous caffeine hydrobromide comprising reacting anhydrous hydrogen bromide with caffeine dissolved in an anhydrous alcohol.

4. The process for producing anhydrous caffeine hydrobromide comprising reacting anhydrous hydrogen bromide with caffeine dissolved in an anhydrous ethanol.

5. The process for producing anhydrous xanthine hydrobromides which comprises reacting anhydrous hydrogen bromide with a xanthine dissolved in an anhydrous solvent.

References Cited in the file of this patent

FOREIGN PATENTS 576,604   Germany _____ May 12, 1955